T. R. PALMER.
VEHICLE TIRE.
APPLICATION FILED MAY 1, 1913.
1,141,723.
Patented June 1, 1915.
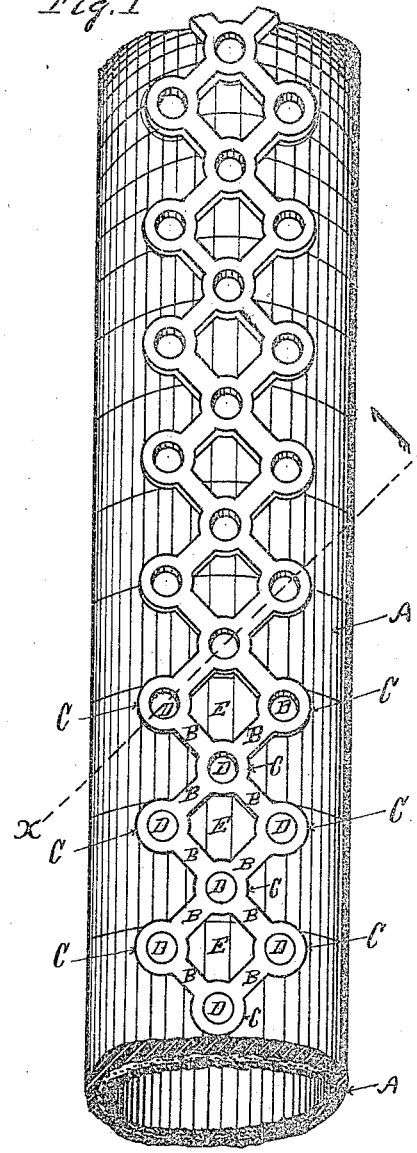
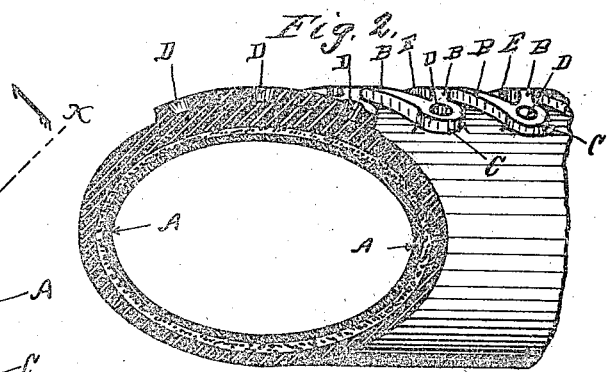
WITNESSES:
INVENTOR.
Theron R. Palmer
BY Sturgeon
ATTORNEY.

UNITED STATES PATENT OFFICE.

THERON R. PALMER, OF ERIE, PENNSYLVANIA.

VEHICLE-TIRE.

1,141,723.

Specification of Letters Patent.

Patented June 1, 1915.

Application filed May 1, 1913. Serial No. 764,879.

*To all whom it may concern:*

Be it known that I, THERON R. PALMER, a citizen of the United States, residing at Erie, in the county of Erie and State of Pennsylvania, have invented certain new and useful Improvements in Vehicle-Tires; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to tires for use on vehicles, and particularly to pneumatic vehicle tires.

The broad, general object of the invention is to provide a tire with a tread surface so designed and constructed as to increase the traction of the tire, and prevent the "skidding" of the vehicle upon a slippery roadway.

The invention primarily consists in providing the tread of the tire with a series of diagonal ribs crossing each other at approximately right angles, and provided with cup like depressions extending below the tops of the ribs, at the points where their ends join, and at the points where they cross each other, by means of which there is provided a circumferential series of rectangular and circular surfaces alternating with each other, depressed below the tops of the ribs and also a circumferential series of circular depressed surfaces at each side of the central row. By means of this construction, I am enabled to combine the so called "vacuum cups" with the diagonal ribs in such a manner that the traction of the tire is increased and at the same time the skidding of the tire on wet or slippery road-ways is prevented.

In the accompanying drawing, Figure 1, is a plan view of a section of my improved tire. Fig. 2, is a transverse section of the same, on the line X—X in Fig. 1.

Referring now to the drawing, the body or tubular portion, A, of the tire, is of the single tube pneumatic type, the tread thereof being provided with a series of diagonal ribs B, provided with circular enlargements C, at the intersections of their centers, and at the junctions of their ends, in the centers of which there are circular depressions or cups, D. The ribs B, so joined at their ends and centers also inclose substantially rectangular depressions E, the bottoms of which are below the tops of the ribs B. These depressions E, thus also form cells, which operate as do the cups D, as "vacuum cups," which act in conjunction with the ribs B, to give adhesion of the tire tread to the road-way upon which it is operated, and prevent its slipping and skidding thereon.

The ribs B, depressions E, and the cups D, are preferably molded upon the tire-tread, integral therewith, and may be spread farther apart or close together, or the angles thereof to a line passing circumferentially around the tire-tread, and may be varied as desired. The ribs and cups are so designed and arranged that they at all times act not only to increase the grip of the tread in the line of rotation of the tire, but also at the same time operate to prevent side-wise movement of the tire-tread upon the road-way.

In placing the ribs diagonally upon the tire-tread and combining the "vacuum" depressions E, and the cups D, therewith, the ribs are in the best shape to prevent the adherence of gravel or other loose matter to the tire-tread, and the wedging thereof between the ribs so as to be carried thereby and be likely to be ground into the tire-tread, as is the case with many types of non-skid tires provided with projections upon the surface thereof, and for this reason both the effectiveness and wear of the tire of my improved tire, are materially increased.

Having thus described my invention and the advantages thereof, so as to enable others to utilize the same, what I claim as new is:

An anti-skid pneumatic tire, having a plurality of peripheral rows of raised cups connected by diagonal ribs, substantially as described.

In testimony whereof I affix my signature, in presence of two witnesses.

THERON R. PALMER.

Witnesses:
WILLIAM J. SURRE,
ROLAND E. SISSON.